(12) United States Patent
Gobe et al.

(10) Patent No.: US 7,095,313 B2
(45) Date of Patent: Aug. 22, 2006

(54) METER APPARATUS FOR VEHICLES

(75) Inventors: Saburou Gobe, Tokyo (JP); Nobuhiro Kojima, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 104 days.

(21) Appl. No.: 10/510,944

(22) PCT Filed: Feb. 9, 2004

(86) PCT No.: PCT/JP2004/001339

§ 371 (c)(1),
(2), (4) Date: Oct. 7, 2004

(87) PCT Pub. No.: WO2004/071799

PCT Pub. Date: Aug. 26, 2004

(65) Prior Publication Data

US 2005/0146421 A1   Jul. 7, 2005

(30) Foreign Application Priority Data

Feb. 12, 2003   (JP)   ............................. 2003-033299

(51) Int. Cl.
*G08B 3/00*   (2006.01)

(52) U.S. Cl. ................ 340/384.1; 340/384.6; 340/384.7; 340/391.1; 381/86; 381/87; 381/386; 381/391; 381/189

(58) Field of Classification Search ............. 340/384.1, 340/384.6, 384.7, 391.1; 381/150, 152, 337, 381/339, 340, 345, 386, 389, 391, 189, 86, 381/87

See application file for complete search history.

(56) References Cited

U.S. PATENT DOCUMENTS 6,522,759 B1 *   2/2003   Mori ......................... 381/150
6,756,883 B1 *   6/2004   Burnett et al. ........... 340/384.1

\* cited by examiner

*Primary Examiner*—Julie Bichngoc Lieu

(57) ABSTRACT

A meter apparatus for a vehicle, includes a circuit board, a sound generating element mounted on one face of the circuit board, a back cover covering the face of the circuit board on which the sound-generating element is mounted, and a separate sound-generating element cap attached to the back cover and covering the sound-generating element in the state that the circuit board is covered with the back cover, the sound-generating element cap being adapted to adjust a sound pressure level of the sound-generating element.

17 Claims, 5 Drawing Sheets

METER APPARATUS FOR VEHICLES

TECHNICAL FIELD

The present invention relates to meter apparatuses for vehicles. More particularly, the invention relates to improvement on adjustment of the sound pressure levels of sound-generating elements such as alert buzzers.

BACKGROUND ART

Heretofore, in meter apparatuses for vehicles such as automobiles and railroad cars, various kinds of alert buzzers are mounted on their circuit boards. For example, alert buzzers are designed to generate sounds during rear drive operation of a vehicle so as to draw driver's attention to a rear side and the like of the vehicle, or to generate sounds when a door is closed while a key is being at an off position so as to prevent a key from being trapped inside a car compartment.

In some vehicles to be used in places where a car speed is restricted, alert buzzers are rung if the vehicles are beyond a given vehicle speed.

Various kinds of sound-generating elements are provided on circuit boards, besides the buzzers aiming at drawing attentions. Such sound-generating elements generate sounds according to their objects under given conditions.

However, the sound-generating elements generate sounds at predetermined sound volume and tone (hereinafter, being hereinafter collectively called "sound pressure level") only.

It is desired that the sound pressure levels are adjusted depending upon the kinds and the grades of the vehicles or the narrow or wide spaces of vehicle compartments.

In case that the sound pressure level of a sound-generating element is to be adjusted, the sound-generating element must be replaced by another giving a different sound pressure level. In some cases, not only a sound-generating element is exchanged, but also a driving circuit for the sound-generating element needs to be replaced by one fitting to the replaced sound-generating element. See JP-A 8-207660.

However, it is not easy to exchange the sound-generating element once mounted on the circuit board so as to change the sound pressure level. There was a fear that the circuit board might be damaged during exchanging work or other metering elements provided on the circuit boards might be broken.

Further, some sound-generating elements cannot be detachably attached to the circuit boards. In such cases, there is no way to change the sound pressure level.

DESCRIPTION OF THE INVENTION

The present invention has been accomplished in view of the circumstances mentioned above, and the invention provides meter apparatuses for vehicles in which the sound pressure level can be easily adjusted with a simple construction.

In order to solve the above problem, according to the meter apparatus for vehicle of the present invention, a separate cap, which is adapted to cover a sound-generating element mounted on a circuit board, is provided at a back cover covering the circuit board. Therefore, the cap can be exchanged with another cap having a different size or comprising a different material or that area of the cap which covers the sound-generating element can be adjusted, whereby the sound pressure level can be adjusted by the above exchange or adjustment.

The meter apparatus for a vehicle according to the present invention comprises a circuit board having on one face thereof a sound-generating element, a back cover covering the face of the circuit board on which the sound-generating element is mounted, and a separate sound-generating element cap attached to the back cover and covering the sound-generating element in the state that the circuit board is covered with the back cover, the sound-generating element cap being adapted to adjust a sound pressure level of the sound-generating element.

According to the present invention, the sound-generating element is provided separately from the back cover. Thus, when the sound-generating element is detached and exchanged with another giving a different sound pressure level from that given by the former one, the sound pressure level of the sound-generating element is adjusted to the different level.

According to the meter apparatus for the vehicle according to the present invention, the near surrounding area of the sound-generating element mounted on the circuit board is covered with the sound-generating element cap attached to the back cover in the state that the face of the circuit board on which the sound-generating element is mounted is covered with the back cover. Therefore, the sound pressure level perceived outside can be varied in the present invention as compared with a case where the sound-generating element is not covered with the sound-generating element cap.

If the sound-generating element cap is designed in a proper shape, a sound pressure level making a greater sound volume perceived can be obtained for a driver sitting in front of the meter apparatus for vehicle as compared with a case where no sound-generating element cap is attached. In this case, high-frequency or low-frequency sound pressure level can be obtained for the tone. As a matter of course, a sound pressure level making perceived sound volume smaller can be obtained as compared with a case where no sound-generating element is attached.

According to the meter apparatus for vehicle of the present invention, the sound pressure level can be adjusted by employing a simple construction that the back cover is attached with the sound-generating element cap to cover the sound-generating element, without using a complicated construction such as a circuit for tuning the sound pressure level of the sound-generating element.

The term "sound-generating element" means not only an alert buzzer provided to alert a driver but also elements so as to make sounds under specific conditions depending upon their respectively intended purposes.

The term "mount" includes welding with solder or the like as well as mounting by surface-mounting technique (SMT) such as a surface-mounting connector.

The circuit board may be a board on which a driving circuit or the like for the sound-generating element is formed alone or a board on which the driving circuit or the like for the sound-generating element is formed together with a circuit for another.

The meter apparatus for vehicle has only to basically include at least the circuit board having the sound-generating element mounted on one face thereof and the back cover. It is no need to say that the meter apparatus may include any of a dial plate for a meter, a front cover, a hood, etc.

The "sound pressure lever" of the sound-generating element does not mean the sound volume, tone and the like of the sound generated by the sound-generating element, but those sound volume, tone and the like of the sound generated by the sound-generating element which are perceived outside.

That is, the sound volume, the tone and the like of the sound generated by the sound-generating element are always constant irrespective of the fact as to whether the sound-generating element is covered with the sound-generating element cap or not or whether that area of the sound-generating element covered with the sound-generating element cap is wide or narrow. That is, the sound volume, the tone and the like of the sound generated by the sound-generating element themselves are not influenced.

To the contrary, those sound volume, tone and the like of the sound generated by the sound-generating element which are perceived outside the sound-generating element vary depending upon the fact as to whether the sound-generating element is covered with the sound-generating element cap or not or whether that area of the sound-generating element covered with the sound-generating element cap is wide or narrow. A person who actually perceives the sound of the sound-generating element is a driver or the like at a place spaced from the sound generating element. The perceived sound corresponds to the sound volume, the tone and the like perceived outside the sound-generating element.

The above explanation is applicable to the following various embodiments of the present invention.

According to an embodiment of the present invention, the sound pressure level of the sound-generating element can be changed depending upon that size of the sound-generating element cap which covers the sound-generating element.

According to another embodiment of the present invention, the sound-generating element cap is attached to a through-hole provided in the back cover at such a position as corresponding to the sound-generating element, the sound-generating element cap comprises a head portion attached to the through-hole of the back cover and a peripheral wall portion extending from the head portion in a direction toward the circuit board, and the head portion and the peripheral wall portion cover at least a part of the sound-generating element.

The size of the sound-generating element cap which covers the sound-generating element is defined by a distance or a gap between an end edge of the peripheral wall portion of the sound-generating element cap and the circuit board in the state that the sound-generating element cap is attached to the back cover.

In addition, when plural kinds of sound-generating element caps having respectively different sizes each adapted to be attached to the back cover are prepared to give different sound pressure levels perceived outside due to differences in size, a desired sound pressure level can be obtained outside by easy operation that any one of the plural sound-generating element caps having different sizes is merely selected, and attached to the back cover.

As a further embodiment of the meter apparatus for vehicle according to the present invention, the sound pressure level of the sound-generating element is adjusted to a desired level depending upon the material of the sound-generating element cap. Therefore, if plural kinds of sound-generating elements caps comprising respectively different materials to exhibit respectively different sound pressure levels are prepared and the sound-generating element cap attached to the back cover is replaced by any one of the other sound-generating element caps, a different sound pressure level can be realized.

So long as the sound-generating element caps make the sound pressure levels different from each other or one another, the material of at least a part of that portion of the sound-generating element cap which covers the sound-generating element is made different between or among the sound-generating element caps.

In addition, a plurality of the sound-generating element caps to be each attached to the back cover which caps comprise respectively different materials are prepared and the different materials make the outside sound pressure levels different from each other or one another. A desired sound pressure level can be obtained outside the sound-generating element by easy operation that any one of the plural sound-generating element caps comprising the respectively different materials is selected, and attached to the back cover.

The meter apparatus for vehicle satisfying the requirements both in claims 2 and 5 or in claim 6 comprises a circuit board, a sound-generating element mounted on one face of the circuit board, a back cover covering the face of the circuit board on which the sound-generating element is mounted, and a separate sound-generating element cap attached to the back cover and covering the sound-generating element in the state that the circuit board is covered with the back cover, wherein a sound pressure level of the sound-generating element is adjusted based on the size and the material of the sound-generating element cap. Therefore, if plural kinds of sound-generating element caps having respectively different sizes and comprising respectively different materials to exhibit respectively different sound pressure levels are prepared and the sound-generating element cap attached to the back cover is replaced by any one of the other sound-generating element caps, a different sound pressure level can be realized. The above embodiment also belongs to one of the embodiments of the present invention.

A third embodiment of the meter apparatus for vehicle of the present invention includes the features of claims 1 and 7 and comprises a circuit board, a sound-generating element attached to on one face the circuit board, a back cover covering the face of the circuit board on which the sound-generating element is mounted, and a separate sound-generating element cap attached to the back cover and covering the sound-generating element in the state that the circuit board is covered with the back cover, wherein a sound pressure level of the sound-generating element is adjusted by the sound-generating element cap based on that area which covers the sound-generating element, the sound-generating element being attached to selected one of plural attaching positions of the back cover giving respectively different covering areas. The sound pressure level of the sound-generating element is changed to another level depending upon the different covering areas.

The plural attaching positions of the back cover principally means positions which allow changes of the attached depth of the sound-generating element cap extending from the level of the back cover toward the circuit board, for example. This means that when the attached depth of the sound-generating element cap is changed, that area of the sound-generating element cap which covers the sound-generating element is changed.

In addition, since the different attaching positions to the back cover are set for the sound-generating element cap to be attached to the back cover, and the different attaching positions give respectively different outside sound pressure levels. Thus, the sound pressure level can be obtained outside at a desired level with even a single sound-generating element cap by changing the attaching position of the cap to another one.

BRIEF DESCRIPTION OF THE DRAWINGS

For a better understanding of the invention, reference is made to the attached drawings, wherein.

BEST MODE FOR CARRYING OUT THE INVENTION

In the following, concrete embodiments of the meter apparatus for vehicle according to the present invention will be explained with reference to the attached drawings.

Figure 1:
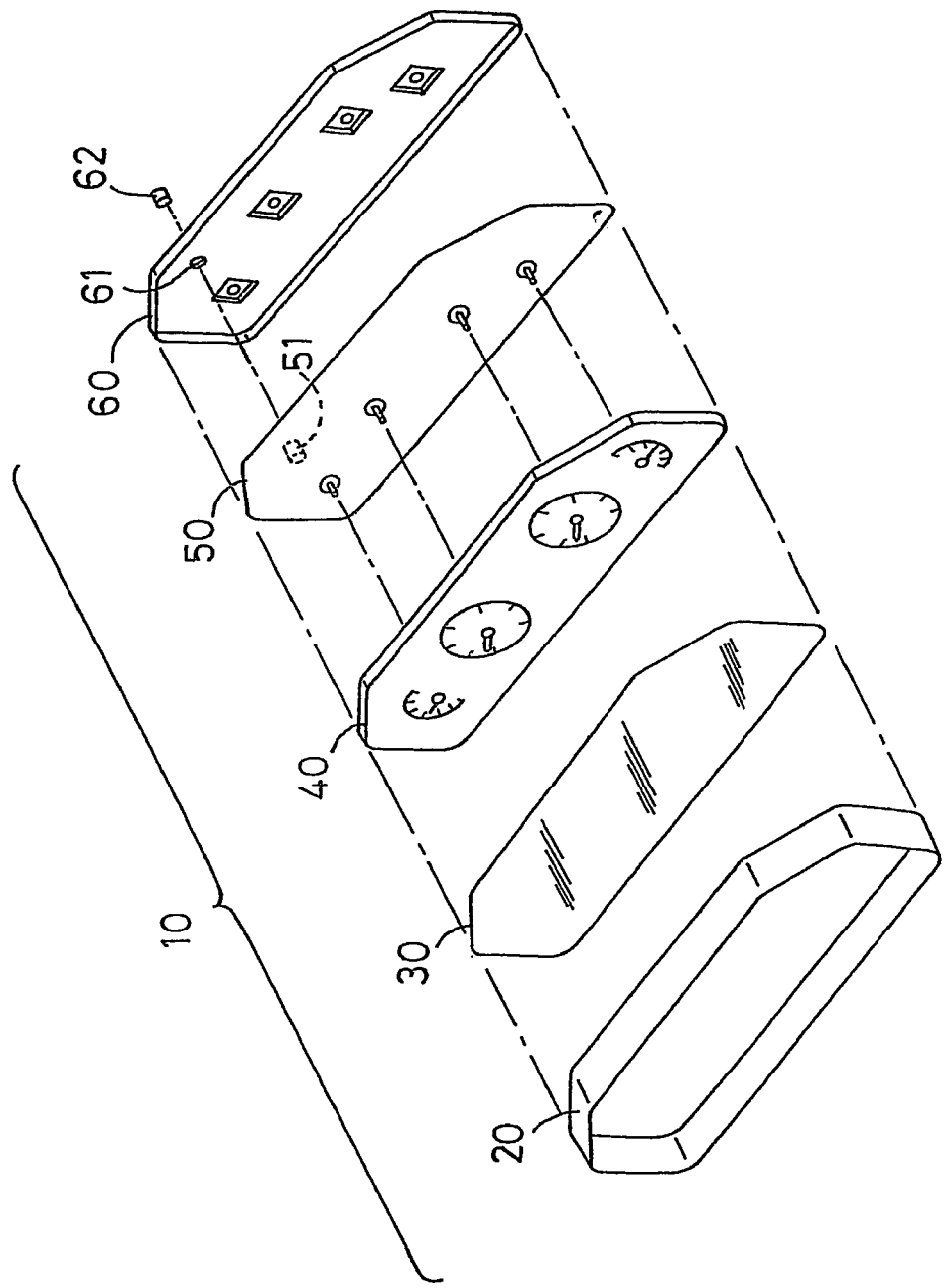
FIG. 1 is a schematically perspective and decomposed view of a meter apparatus for a vehicle according to one embodiment of the present invention.

FIG. 1 is a perspective and decomposed view of the meter apparatus according to the first embodiment of the meter apparatus for vehicle of the present invention.

The meter apparatus 10 for vehicle as shown comprises a dial plate 40 on or in which speed gauges for a speed meter, etc. are borne, a circuit board 50 provided on a rear face side of the dial plate 40 and formed with an electric circuit for driving a meter indicator or the like indicated or shown on the dial plate 40, a back cover 60 sandwiching the circuit board 50 between the dial plate 40, and a transparent front cover 30 covering a front face of the dial plate 40 and a hood 20 covering the surrounding area of at least the front cover 30.

Various electric elements and electronic elements mounted on the electric circuit of the circuit board 50 are arranged on a rear face side of the circuit board 50 or its face opposed to the back cover 60.

Such electric and electronic elements include an alert buzzer 51 to make a sound during backward movement of the vehicle.

A cap-attaching hole 61 is formed in the back cover 60 in a place corresponding to the alert buzzer 51 in the state that the circuit board 50 is covered with the back cover 60.

Figure 2A:
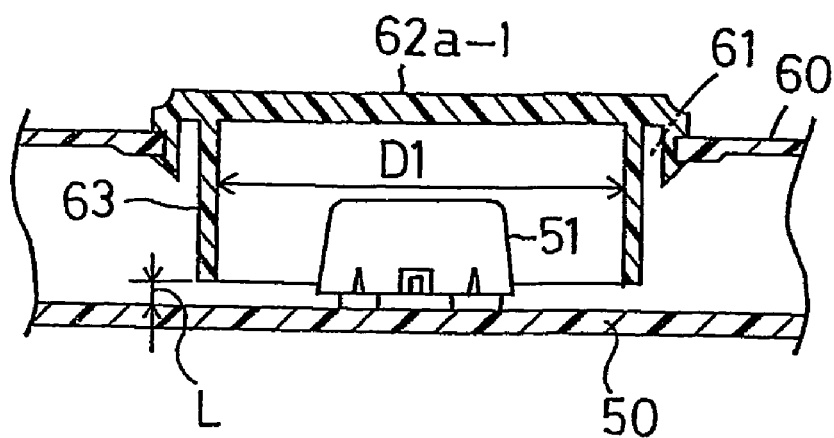
FIGS. 2A to 2C are sectional views of other embodiments in which replaceable buzzer caps with peripheral wall portions having respectively different diameters are provided.
Figure 2B:
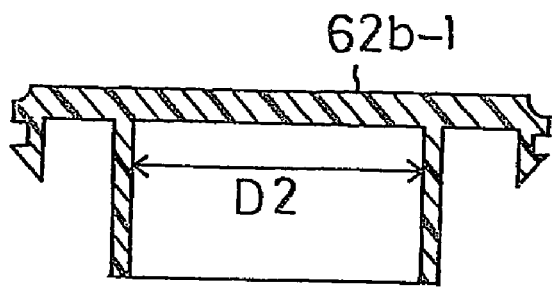
Figure 2C:
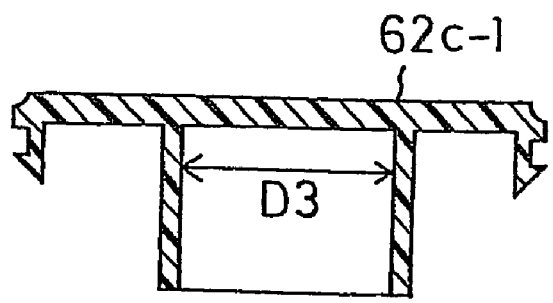

As sectionally shown in FIG. 2A, the cap-attaching hole 61 is attached with a buzzer cap 62 to cover the surrounding area of the alert buzzer.

The buzzer cap 62 includes a head portion covering the cap-attaching hole 61 and a cylindrical peripheral wall portion 63 extending from the under face of the head portion and surrounding the surrounding area of the alert buzzer 63. The cap is so designed that a space or gap L may be ensured between an end edge of the peripheral wall portion 63 and the circuit board 50 in the state that the circuit board 50 is covered with the back cover 60.

In this case, three kinds of buzzer caps 62 are prepared, which have respectively different inner diameters of their peripheral wall portions.

That is, the inner diameter of the buzzer cap 62a-1 shown in FIG. 2A is designed to have the largest diameter of the peripheral wall portion 63 at D1, and those of the buzzer caps 62b-1 and 62c-1 are designed at inner diameter D2(<D1) and inner diameter D3(<D2), respectively.

Any on of these three kinds of the buzzer caps 62a-1 to 62c-1 can be interchangeably attached to the cap-attaching hole 61.

The perceived sound pressure level (sound volume, tone, etc.) perceived of the alert sound generated by the alert buzzer 51 is varied by these buzzer caps 62a-1 to 62c-1 due to differences in size among the peripheral wall portions 63.

According to the meter apparatus 10 for vehicle of the thus constituted embodiment, any one of the buzzer caps 62a-1 to 62c-1 having respectively different sizes as mentioned above can be selectively attached to the cap-attaching hole 61 of the back cover 60, and the sound pressure level of the alert sound generated from the alert buzzer 51 and perceived by the driver or the like can be changed depending upon the size of the buzzer cap 62a-1, 62b-1 or 62c-1 attached.

The sound pressure level can be changed by easy operation that a plurality of the sound-generating element caps 62a-1 to 62c-1 to be each attached to the cap-attaching hole of the back cover 61 and having different sizes are prepared and a selected one of them is attached to the attaching hole of the back cover. This can be realized by the simple construction of the buzzer caps having the respectively different sizes.

There kinds of the buzzer caps prepared as having different inner diameters of the peripheral wall portions 63 are recited by way of example. Two kinds or four or more kinds of the buzzer caps may be acceptable.

In the meter apparatus 10 for vehicle according to the above embodiment, the sizes of the caps to cover the alert buzzer 51 are made different from one another by making the inner diameters of the peripheral wall portions 63 covering the alert buzzer 51 different from one another. The lengths of the peripheral wall portions 63 of the buzzer caps 62 may be made different from one another.

Figure 3A:
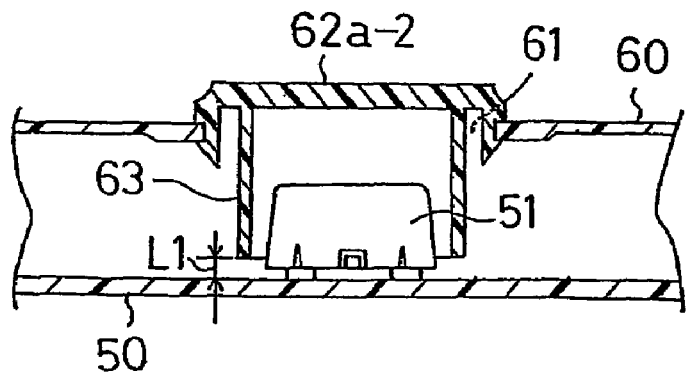
FIGS. 3A to 3C are sectional views of further embodiments in which replaceable buzzer caps with peripheral wall portions having respectively different lengths are provided.
Figure 3B:
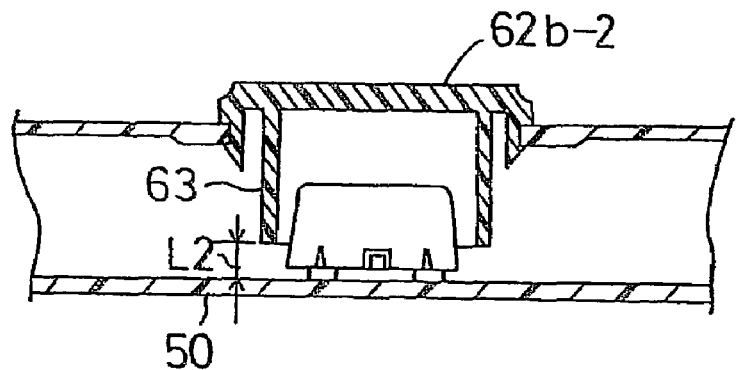
Figure 3C:
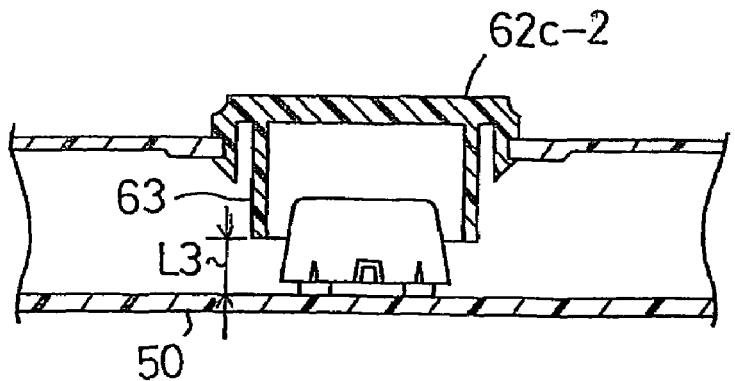

That is, as shown in FIGS. 3A to 3C, while the inner diameters of the buzzer caps 62a-2 to 62c-2 are identical with one another, gaps L between the end edge of each of the peripheral wall portions 63a-2 to 63c-2 vary from L1, L2(>L1) to L3(>L2) by varying the length of the peripheral wall portion 63 of the buzzer cap.

Since a difference in the gap L greatly influences the sound pressure level of the alert sound, the sound pressure level can be adjusted by simple construction and operation that a plurality of buzzer caps 62a-2 to 62c-2 with the peripheral wall portions having respectively different lengths are prepared, and one of them is selected and attached to the cap-attaching hole 61 of the back cover 60.

There kinds of the buzzer caps prepared as having the respectively different lengths of the peripheral wall portions 63 are recited by way of example. Needless to say, two kinds or four or more kinds of the buzzer caps may be acceptable.

While the inner diameter and the length of the buzzer caps 62 are made identical, the sound pressure level can be changed by varying the material of at least peripheral wall portion 63.

Figure 4A:
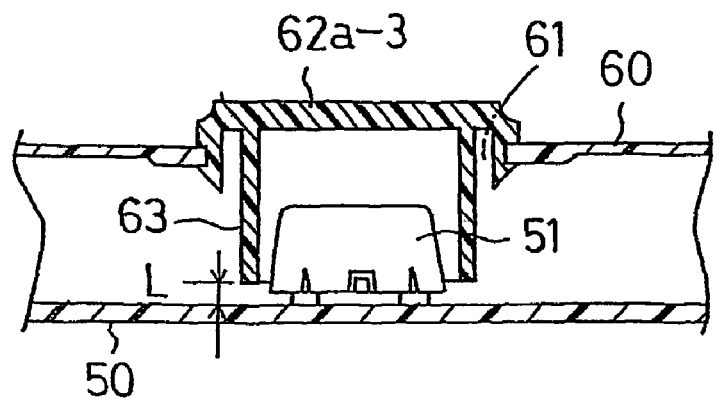
FIGS. 4A to 4D are sectional views of still further embodiments in which replaceable buzzer caps made of respectively different materials are provided.
Figure 4B:
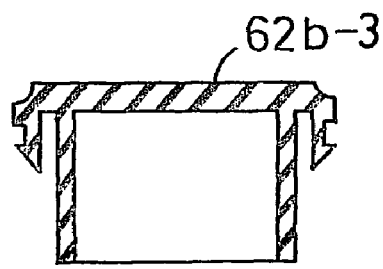
Figure 4C:
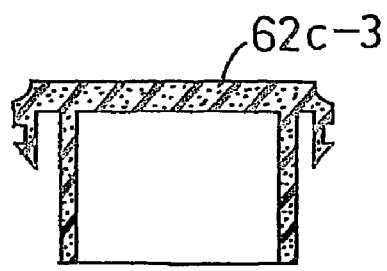
Figure 4D:
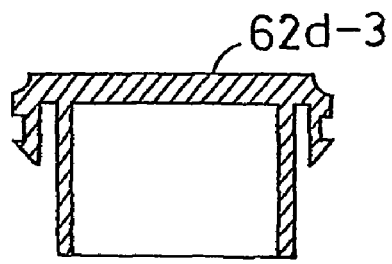

That is, the sound pressure level can be adjusted by simple construction and easy operation that a buzzer cap 62a-3 made of a resin shown in FIG. 4A, that 62b-3 made of rubber shown in FIG. 4B, that 62c-3 made of sponge shown in FIG. 4C and that 62d-3 made of a metal shown in FIG. 4D are prepared, and one of them is selected and attached to the cap-attaching hole 61 of the back cover 60.

The materials and the kinds of the buzzer caps 62 are recited by way of example. Needless to say, other materials may be employed. Further, two or three kinds or five or more kinds of the buzzer caps may be employed.

The meter apparatus in which any of the plural buzzer caps 62 comprising the respectively different materials is selected and attached to the back cover may be one embodiment of the meter apparatus for vehicle according to the present invention.

The plural buzzer caps 62 to be prepared and selected may be produced by arbitrarily combining any two or more of the different inner diameters, different lengths and different materials of the peripheral wall portions 63.

Figure 5:
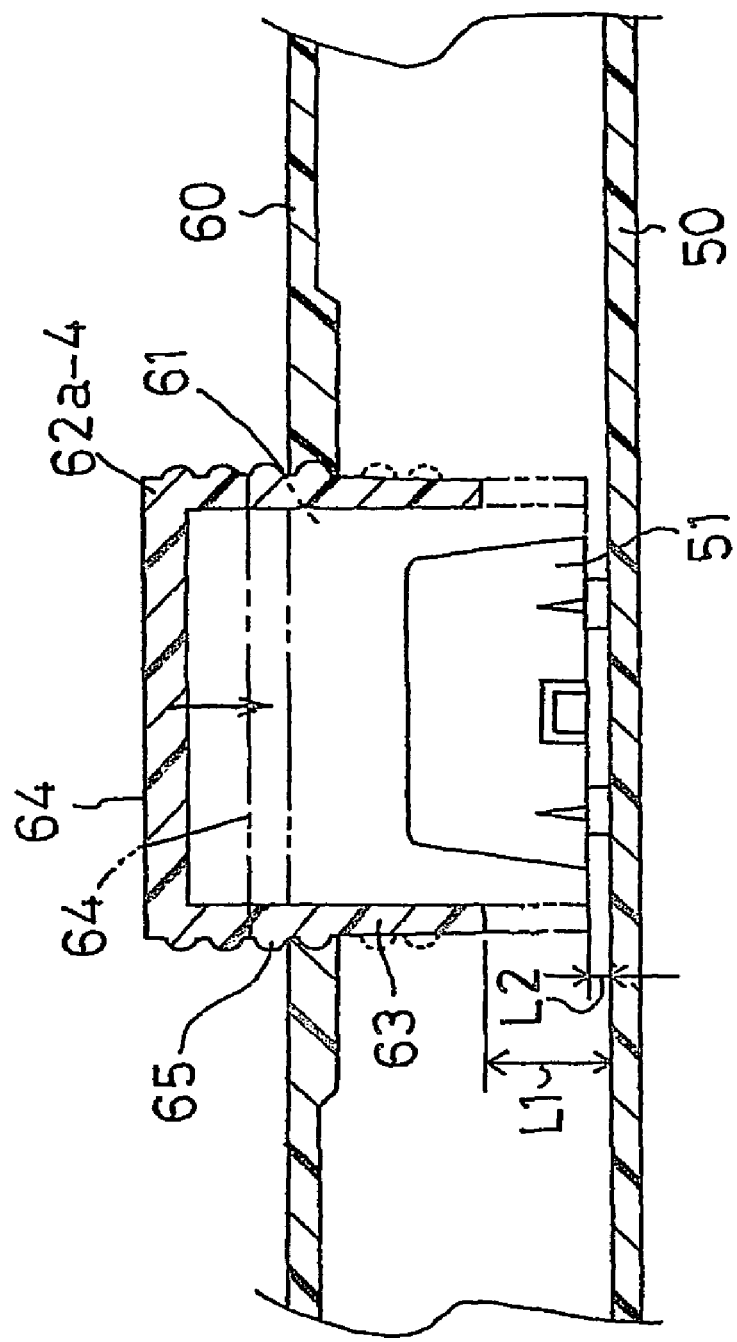
FIG. 5 is a sectional view of a still further embodiment in which a single buzzer cap is provided.

FIG. 5 is a sectional view of a further embodiment of the meter apparatus for vehicle according to the present invention.

In the illustrated meter apparatus, a back cover 60 is attached with a buzzer cap 64*a*-4 to cover an alert buzzer 51 in the state that a circuit board 50 is covered with a back cover 60. This buzzer cap 64*a*-4 is attached to the back cover 60 at a selected one of attaching depths affording respectively different covering areas to make the sound pressure levels generated by the alert buzzer and perceived outside different from one another.

That is, an outer peripheral face of a peripheral wall portion 63 of the buzzer cap 64*a*-4 is formed with many attaching projections 65 to lock with the attaching hole 61 of the back cover 60 along the axial direction (a direction shown by an arrow) of the peripheral wall portion 63, so that the buzzer cap can be locked at any attaching depth position within a given range (from a solid-line position to a two-dotted line position) along the axial direction.

Thus, the gap L between the end edge of the peripheral wall portion 63 of the buzzer cap and the circuit board 50 can be varied within a predetermined lockable range with the maximum gal L1 to the minimum gap L2, depending on the locking position of the buzzer cap 64.

As explained in connection with FIGS. 3A to 3C, difference in gap L largely influences the sound pressure level of the alert sound. Thus, the outside sound pressure level of the alert sound generated by the alert buzzer 51 can be adjusted by a single buzzer cap 64*a*-4 through simple construction and easy operation that the locking position of the buzzer cap 64 is adjusted in a direction of an attaching depth.

The structure for specifying the locking positions is not limited to the above-mentioned locking projections 65, but various other designs of locking portions maybe employed.

When a locking portion is formed for each of non-continuous locking positions or dispersed plural attaching positions, a sound pressure level corresponding to each of the locking positions can be easily obtained. The sound pressure level can be adjusted to a desired level without making attachment under consideration of fine positional adjustment as compared with a case where the locking positions are continuously set.

On the other hand, as the locking portion forming the continuous locking position, it may be that a male screw is formed around the outer peripheral face of the peripheral wall portion 63 of the buzzer cap 64, a female screw screwing with the male screw is formed around an inner peripheral face of the attaching hole 61 of the back cover 60 and the male and female screws are screwed together. By so constructing, the locking position or the gap L can be arbitrarily adjusted in the attaching depth direction to control the sound pressure level.

In the above-mentioned the meter apparatuses 10 according to the various embodiments, it is explained that the sound pressure level of the alert buzzer 51 is simply and easily adjusted. The object of which sound pressure level is to be adjusted is not limited to the alert buzzer 51 provided to draw a driver's attention. Objects of which sound pressure levels are to be adjusted are not limited to alert buzzers to draw drivers' attention, but sound-generating elements designed to generate sounds under given conditions depending upon respectively intended purposes may be targeted.

It is to be noted that many alert buzzers generally generate beep sounds, and are easily employed as common parts irrespective of kinds and grades of vehicles on which the meter apparatuses are to be mounted.

Therefore, as compared with other sound-generating elements, the alert buzzer has a greater effect in that the sound pressure level is varied depending upon the kinds and the grades of vehicles.

As mentioned above, according to the meter apparatus of the present invention, the sound pressure level outside the sound-generating element can be adjusted by replacing the sound-generating element cap attached to the back cover by another having a different size or comprising a different material or by adjusting its area covering the sound-generating element.

That is, according to the meter apparatus of the present invention, since the near surrounding area of the sound-generating element mounted on the circuit board is covered with sound-generating element cap attached to the back cover in the state that the face of the circuit board on which the sound-generating element is mounted is covered with the back cover, the outside sound pressure level can be varied as compared with the case where the sound-generating element is covered with no sound-generating element cap.

In addition, when plural sound-generating element caps to be attached to the back cover and having different sizes which give rise to outside different sound pressure levels are prepared, sound at a sound pressure level desired outside the sound-generating element can be obtained by easy operation that one of these plural sound-generating element caps having different sizes is selected and attached to the back cover.

If the sound-generating element cap is designed in a proper shape, a sound pressure level making a greater sound volume perceived can be obtained for a driver sitting in front of the meter apparatus for vehicle as compared with a case where no sound-generating element cap is attached. In this case, high-frequency or low-frequency sound pressure level can be obtained for the tone. As a matter of course, a sound pressure level making perceived sound volume smaller can be obtained as compared with a case where no sound-generating element is attached.

According to the meter apparatus for vehicle of the present invention, the sound pressure level of the sound-generating element can be adjusted by employing a simple construction that the back cover is attached with the sound-generating element cap to cover the sound-generating element, without using a complicated construction such as a circuit for tuning the sound pressure level of the sound-generating element.

In addition, a plurality of the sound-generating element caps to be attached to the back cover which caps comprise respectively different materials are prepared, and the different materials make the outside sound pressure levels different from each other or one another. Thus, a desired sound pressure level can be obtained outside the sound-generating element by easy operation that any one of the plural sound-generating element caps comprising the respectively different materials is selected, and attached to the back cover.

In addition, since the different attaching positions to the back cover are set for the back cover to be attached to the back cover, and the different attaching positions give respectively different outside sound pressure levels. Thus, the sound pressure level can be obtained outside at a desired level by using even a single sound-generating element through changing the attaching position to another one.

What is claimed is:

1. A meter apparatus for a vehicle, comprising a circuit board, a sound-generating element mounted on one face of the circuit board, a back cover covering the face of the circuit board on which the sound-generating element is mounted, and a separate sound-generating element cap attached to the back cover and covering the sound-generating element in the state that the circuit board is covered with the back cover, the sound-generating element cap being adapted to adjust a sound pressure level of the sound-generating element.

2. The meter apparatus for vehicle set forth in claim 1, wherein said sound pressure level of the sound-generating element is adjusted based on a size of the sound-generating element cap.

3. The meter apparatus for vehicle set forth in claim 2, wherein the sound-generating element cap is attached to a through-hole provided in the back cover at such a position as corresponding to the sound-generating element, the sound-generating element cap comprises a head portion attached to the through-hole of the back cover and a peripheral wall portion extending from the head portion in a direction toward the circuit board, and the head portion and the peripheral wall portion cover at least a part of the sound-generating element.

4. The meter apparatus for vehicle set forth in claim 3, wherein a size of the sound-generating element cap is defined by a distance or a gap between an end edge of the peripheral wall portion of the sound-generating element cap covering the sound-generating element and the circuit board in the state that the sound-generating element cap is attached to the back cover.

5. The meter apparatus for vehicle set forth in claim 1, wherein said sound pressure level of the sound-generating element is adjusted based on a material of the sound-generating element cap.

6. The meter apparatus for vehicle set forth in claim 2, wherein said sound pressure level of the sound-generating element is adjusted based on a material of the sound-generating element cap.

7. The meter apparatus for vehicle set forth in claim 1, wherein said sound pressure level of the sound-generating element is adjusted based on that area of the sound-generating element which is covered with the sound-generating element cap.

8. The meter apparatus for vehicle set forth in claim 2, wherein said sound pressure level of the sound-generating element is adjusted based on that area of the sound-generating element which is covered with the sound-generating element cap.

9. The meter apparatus for vehicle set forth in claim 5, wherein said sound pressure level of the sound-generating element is adjusted based on that area of the sound-generating element which is covered with the sound-generating element cap.

10. The meter apparatus for vehicle set forth in claim 7, wherein the area of the sound-generating element which is covered with the sound-generating element cap is adjustable by changing a distance or a gap between an end edge of the peripheral wall portion of the sound-generating element cap covering the sound-generating element and the circuit board in the state that the sound-generating element cap is attached to the back cover.

11. The meter apparatus for vehicle set forth in claim 7, wherein the sound-generating element cap is provided with plural locking portions each adapted to lock to the back cover and different sound pressure levels are obtainable in case that the sound-generating element cap is attached to the back cover at respectively plural locking portions.

12. The meter apparatus for vehicle set forth in claim 1, wherein the sound-generating element is an alert buzzer.

13. The meter apparatus for vehicle set forth in claim 2, wherein the sound-generating element is an alert buzzer.

14. The meter apparatus for vehicle set forth in claim 3, wherein the sound-generating element is an alert buzzer.

15. The meter apparatus for vehicle set forth in claim 5, wherein the sound-generating element is an alert buzzer.

16. The meter apparatus for vehicle set forth in claim 7, wherein the sound-generating element is an alert buzzer.

17. A kit for producing a meter apparatus for vehicle, said kit comprising a circuit board, a sound-generating element mounted on one face of the circuit board, a back cover covering the face of the circuit board on which the sound-generating element is mounted, and a plurality of separate sound-generating element caps each adapted to be attached to the back cover and covering the sound-generating element in the state that the circuit board is covered with the back cover, the sound-generating element caps being adapted to adjust a sound pressure level of the sound-generating element to respectively different levels, whereby an intended meter apparatus for vehicle is produced by selecting any one of a plurality of the sound-generating element cap and attaching the selected one to the back cover.

* * * * *